US010246034B2

(12) United States Patent
Malcom et al.

(10) Patent No.: US 10,246,034 B2
(45) Date of Patent: Apr. 2, 2019

(54) POWER DISTRIBUTION CENTER MOUNTING ASSEMBLY

(71) Applicant: Sumitomo Wiring Systems, Ltd., Yokkaichi, Mie (JP)

(72) Inventors: Bennie J. Malcom, Farmington Hills, MI (US); Brian D. Carnick, Farmington Hills, MI (US); Hala Qola, Farmington Hills, MI (US)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 29 days.

(21) Appl. No.: 15/372,902

(22) Filed: Dec. 8, 2016

(65) Prior Publication Data

US 2018/0162298 A1  Jun. 14, 2018

(51) Int. Cl.
  *B60R 16/023* (2006.01)
(52) U.S. Cl.
  CPC ................................ *B60R 16/0238* (2013.01)
(58) Field of Classification Search
  USPC ....... 248/27.3, 27.1, 222.51, 222.52, 225.21; 174/535, 541, 542, 545, 63; 361/825, 361/657, 658
  See application file for complete search history.

(56) References Cited

U.S. PATENT DOCUMENTS

| 5,330,411 | A  |   | 7/1994  | Fujitani et al. |
| 5,621,846 | A  | * | 4/1997  | Smith ..................... F24C 7/065 248/324 |
| 5,823,495 | A  | * | 10/1998 | Joss .................... B60R 11/0205 248/27.1 |
| 6,193,531 | B1 | * | 2/2001  | Ito .................... H01R 13/62933 439/140 |
| 6,611,424 | B2 | * | 8/2003  | Huang ................. G11B 33/128 248/224.51 |
| 6,795,309 | B2 | * | 9/2004  | Hartung .................. G06F 1/184 248/27.1 |
| 8,456,831 | B1 | * | 6/2013  | Pang ....................... G06F 1/187 248/221.11 |

* cited by examiner

*Primary Examiner* — Alfred J Wujciak
(74) *Attorney, Agent, or Firm* — Honigman LLP

(57) ABSTRACT

A power distribution center mounting assembly for a vehicle includes a power distribution center having a connection surface. The power distribution center also includes a housing having a locking structure formed thereon on at least one side of the housing. The housing also includes a pair of pivot structures disposed on opposing sides of the housing. A pair of pivot brackets are mounted on the vehicle with each of the brackets including a pivot slot formed therein receiving the pivot structures. At least one of the pivot brackets includes corresponding lock slots that releasably engage the locking structure defining a pre staged and a final staged position of the power distribution center. When the power distribution center is in the pre staged position the connection surface is positioned at an inclined angle wherein the connection surface is visible relative to a horizontal plane extending from a bottom of the housing.

11 Claims, 7 Drawing Sheets

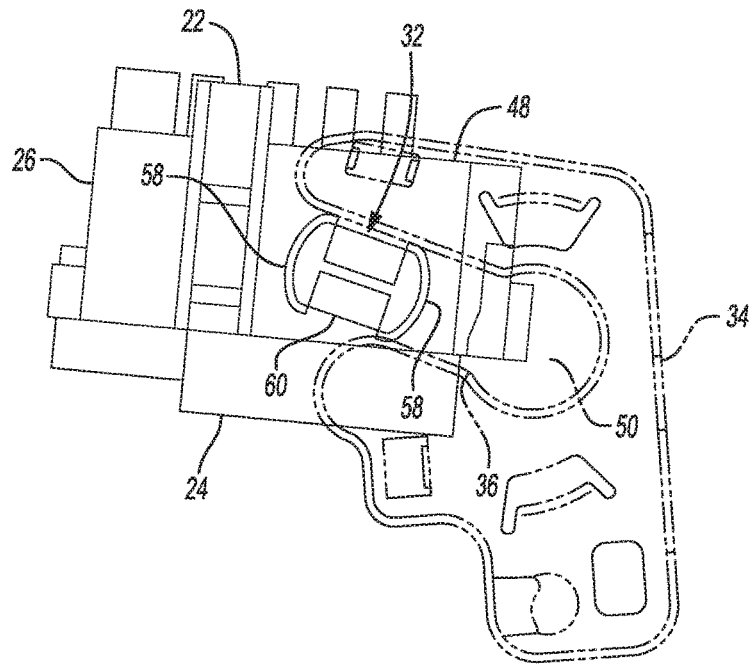
Fig-9
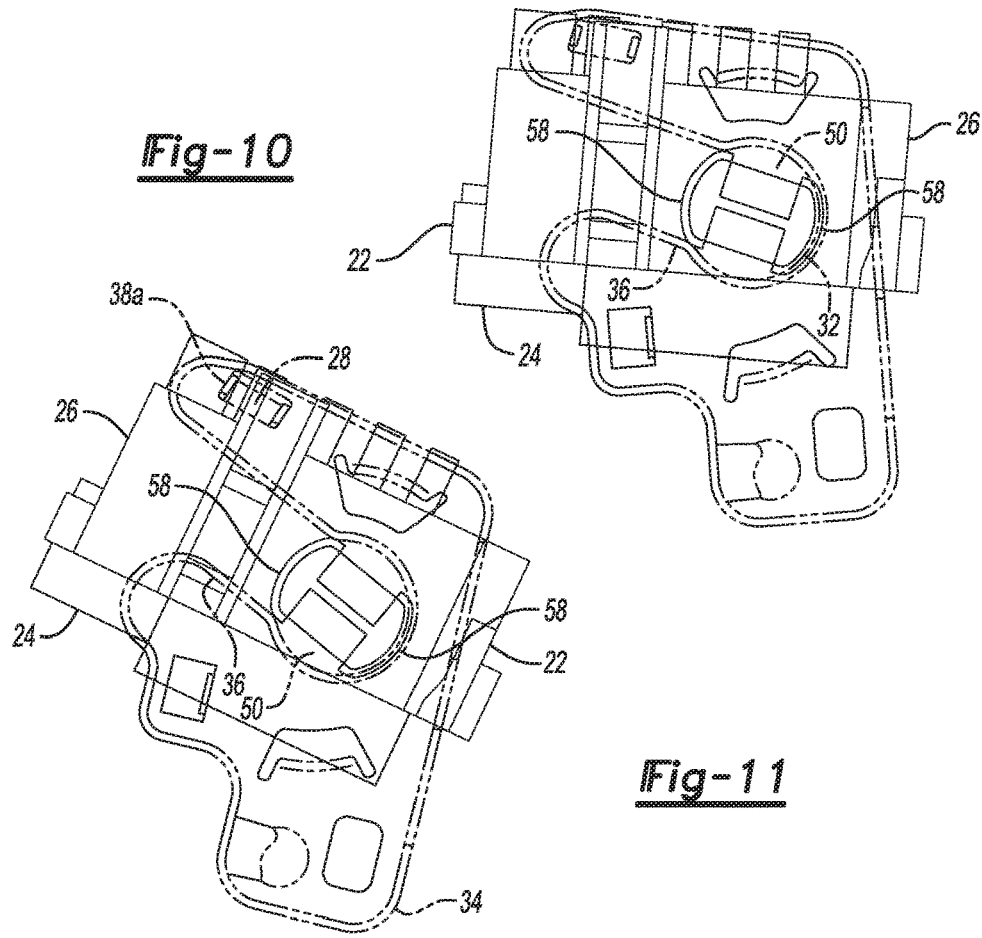
Fig-10
Fig-11

US 10,246,034 B2

POWER DISTRIBUTION CENTER MOUNTING ASSEMBLY

FIELD OF THE INVENTION

The invention relates to a mounting assembly for a power distribution center for an automobile.

BACKGROUND OF THE INVENTION

Power distribution centers may be supplied in an automobile or vehicle to distribute power and provide control and regulation over various power supplies and controls within a vehicle. Power distribution centers may be attached to a vehicle on an instrument panel on a lower portion below a steering column. Various connectors and electrical lines are routed to and from the power distribution center to other portions of the vehicle. When installing a power distribution center in a vehicle typically various connectors are mated with the power distribution center to route power and control signals to various locations within the vehicle. One common problem associated with the assembly of such power distribution centers is that the connectors must typically be directed away from a vehicle compartment such that an occupant cannot easily access the connections and potentially or accidentally disconnect one of the connections. Therefore, power distribution centers are typically mounted such that the connections are away from the vehicle compartment requiring a blind operation to attach connectors to the power distribution center by a manufacturer. Such blind operations are difficult and require greater amounts of time to complete.

There is therefore a need in the art for a power distribution center that may be mounted on a vehicle and is easily accessible when assembling the power distribution center and is then movable to a position such that the connections are away from an occupant within a vehicle compartment.

There is also a need in the art for a power distribution mounting system that releasably retains the power distribution center and allows servicing while eliminating potential rattles and noise when attached to a vehicle.

SUMMARY OF THE INVENTION

In one aspect, there is disclosed a power distribution center mounting assembly for a vehicle that includes a power distribution center having a connection surface. The power distribution center also includes a housing having a locking structure formed thereon on at least one side of the housing. The housing also includes a pair of pivot structures disposed on opposing sides of the housing. A pair of pivot brackets are mounted on the vehicle with each of the brackets including a pivot slot formed therein receiving the pivot structures. At least one of the pivot brackets includes corresponding lock slots that releasably engage the locking structure defining a pre staged and a final staged position of the power distribution center. When the power distribution center is in the pre staged position the connection surface is positioned at an inclined angle wherein the connection surface is visible relative to a horizontal plane extending from a bottom of the housing.

In another aspect, there is disclosed a power distribution center mounting assembly that includes a power distribution center having a connection surface. The power distribution center also includes a housing. The housing has a locking structure formed thereon on at least one side of the housing. The housing also includes a pair of pivot structures disposed on opposing sides of the housing. A pair of pivot brackets is mounted on the vehicle. Each of the pair of pivot brackets includes a pivot slot formed therein receiving the pivot structures. At least one of the pivot brackets includes a pre staged lock slot formed therein and a final staged lock slot formed therein. The power distribution center has a pre staged position wherein the locking structure is releasably positioned in the pre staged lock slot and the connection surface is positioned at an inclined angle of from 10 to 30 degrees relative to a horizontal plane. The power distribution center also includes a final staged position wherein the locking structure is releasably positioned in the final staged lock slot and the connection surface is positioned at an angle of from 80 to 100 degrees relative to the horizontal plane.

In yet a further aspect there is disclosed a power distribution center mounting assembly for a vehicle that includes a power distribution center having a connection surface. The power distribution center includes a housing having a locking structure formed thereon on at least one side of the housing. The housing also includes a pair of pivot structures disposed on opposing sides of the housing. A pair of pivot brackets are mounted on the vehicle with each of the pivot brackets including a pivot slot formed therein receiving the pivot structures. At least one of the pivot brackets includes corresponding lock slots that releasably engage the locking structure defining a pre staged and a final staged position of the power distribution center. When in the pre staged position, the connection surface is positioned at an inclined angle wherein the connection surface is visible relative to a horizontal plane extending from a bottom of the housing. The housing includes at least one rib that engages at least one rib flange of the pivot brackets when the power distribution center is in the final staged position.

BRIEF DESCRIPTION OF THE DRAWINGS

FIG. 9 is a side view with the endcaps removed showing insertion of the pivot structure within the pivot slots;

FIG. 10 is a side view of the power distribution center in a position before a pre staged position in which the pivot structure is fully disposed within the pivot slot;

FIG. 11 is a side view of the power distribution center in a pre-staged position with the pre staged lock engaged;

DETAILED DESCRIPTION OF THE PREFERRED EMBODIMENTS

Figure 17:
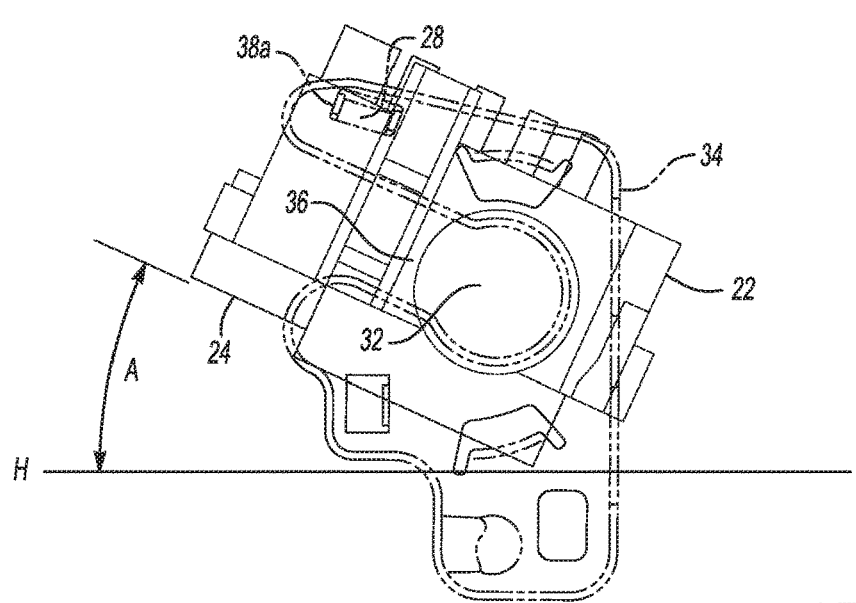
FIG. 17 is a side view showing the inclined angle of the connection surface relative to a horizontal plane.

Referring to the figures, there is shown a power distribution center mounting assembly 20 for a vehicle. The power distribution center mounting assembly 20 includes a power distribution center 22 having a connection surface 24. The power distribution center 22 includes a housing 26. Various electrical components including fuses, junctions, controllers, as well as other electrical components may be disposed within the housing allowing routing and control of various other components within the vehicle. In one aspect, the connection surface 24 includes various cavities and couplings allowing connection of wire harnesses and other such assemblies. In one aspect, the housing 26 includes a locking structure 28 formed thereon on at least one side 30 of the housing 26. The housing 26 also includes a pair of pivot structures 32 that are disposed on opposing sides 30 of the housing 26. A pair of pivot brackets 34 is mounted on the vehicle. Each of the pair of pivot brackets 34 includes a pivot slot 36 formed therein that receives the pivot structures 32. At least one of the pivot brackets 34 includes corresponding lock slots 38 that releasably engage the locking structure 28 defining a pre staged and a final staged position of the power distribution center 22. When in the pre staged position, the connection surface 24 is positioned at an inclined angle wherein the connection surface 24 is visible relative to a horizontal plane H extending from a bottom of the housing 26, as shown in FIG. 17.

Figure 14:
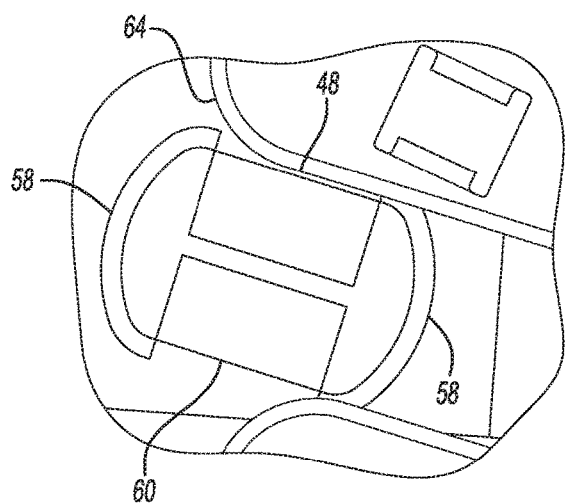
FIG. 14 is a partial side view of the pivot structure being positioned in a pivot slot.

The corresponding lock slots 38 of the at least one pivot bracket 34 may include a pre staged lock slot 38a formed therein and a final staged lock slot 38b formed therein. When the power distribution center 22 is in the pre staged position the locking structure 28 is releasably positioned in the pre staged lock slot 38a. The connection surface 24 is positioned at an inclined angle A of from 10 to 30 degrees relative to the horizontal plane H, as best shown in FIG. 17. When the power distribution center is in the final staged position the locking structure 28 is releasably positioned in the final staged lock slot 38b and the connection surface 24 is positioned at an angle A of from 80 to 100 degrees relative to the horizontal plane H from the bottom of the housing 26, as best seen in FIG. 14.

In one aspect, the pivot brackets 34 include a body 40 having a pair of separated arms 42 that define the pivot slot 36. The body 40 also includes mounting tabs 44 for attaching to a vehicle structure such as an IP reinforcement or other such mounting structure. In one aspect, the pivot slot 36 extends from an opening 46 on a proximal end of the pivot slot 36 and continues along an alignment section 48 having planar walls that terminate at an ovoid pivot hub 50 at a distal end of the pivot slot 36. The pivot brackets 34 may include at least one rib contact flange 52 formed thereon. In one aspect, each of the pivot brackets 34 may include two or more rib contact flanges 52 that engage with a rib 54 formed on the housing 26, as will be discussed in more detail below.

In one aspect, the pivot structures 32 may include an oval cylinder 56 that extends from the side 30 of the housing 26. The oval cylinder 56 may include opposing circular surfaces 58 separated by a flat surface 60. The pivot structure 32 may include an endcap 62 formed thereon that defines a contact region of the pivot structures 32 with the pivot slot 36. In one aspect, the flat surface 60 includes a length that is less than or equal to a major axis of the ovoid pivot hub 50 that is formed at a distal end of the pivot slot 36. In this manner, the flat surfaces 60 may be inserted into the pivot slot 36 and be guided along the alignment section 48 having planar walls until the opposing circular surfaces 58 are positioned fully within the ovoid pivot hub 50. In his manner, the length of the flat surface 60 assures that the circular surfaces 58 are contacting at least a portion of the ovoid pivot hub 50 as the power distribution center 22 is rotated from one position to another, as will be discussed in more detail below.

Operation and installation of the power distribution center mounting assembly 20 will be discussed with reference to the various figures. Referring to FIGS. 1, 8, 9, and 14, the pair of pivot brackets 34 may be mounted or attached to the vehicle via the mounting tabs 44 formed on the pivot brackets 34. The pivot brackets 34 are spaced apart from each other a distance corresponding to a width of the power distribution center 22 and the pivot structures 32. Next a person assembling the power distribution center 22 on the vehicle may visually align the power distribution center 22 including the pivot structures 32 such that they are slid within the pivot slots 36 formed in the pivot brackets 34. In one aspect, the opening 46 of the pivot slot 36 includes a lead-in radius 64 formed thereon that aligns the pivot structure 32 in the pivot slot 36 and allows for easy initial positioning of the power distribution center 22 within the pivot slots 36 of the pair of pivot brackets 34.

As the pivot structures 32 are positioned within the pivot slot 36, the flat surface 60 of the pivot structure 32 contacts the planar walls of the alignment section 48 of the pivot slot 36 such that the power distribution center 22 is slid and guided into the pivot slot 36. Continued motion of the power distribution center 22 along the alignment section 48 continues until the circular surface 58 of the pivot structure 32 contacts and is positioned fully within the ovoid pivot hub 50 at the distal end of the pivot slot 36. As described above, the flat surface 60 includes a length less than or equal to a major axis of the ovoid pivot hub 50 at the distal end such that the circular surfaces 58 are positioned within the ovoid pivot hub 50 and contact to assure a uniform rotational motion as will be described in more detail below.

Figure 1:
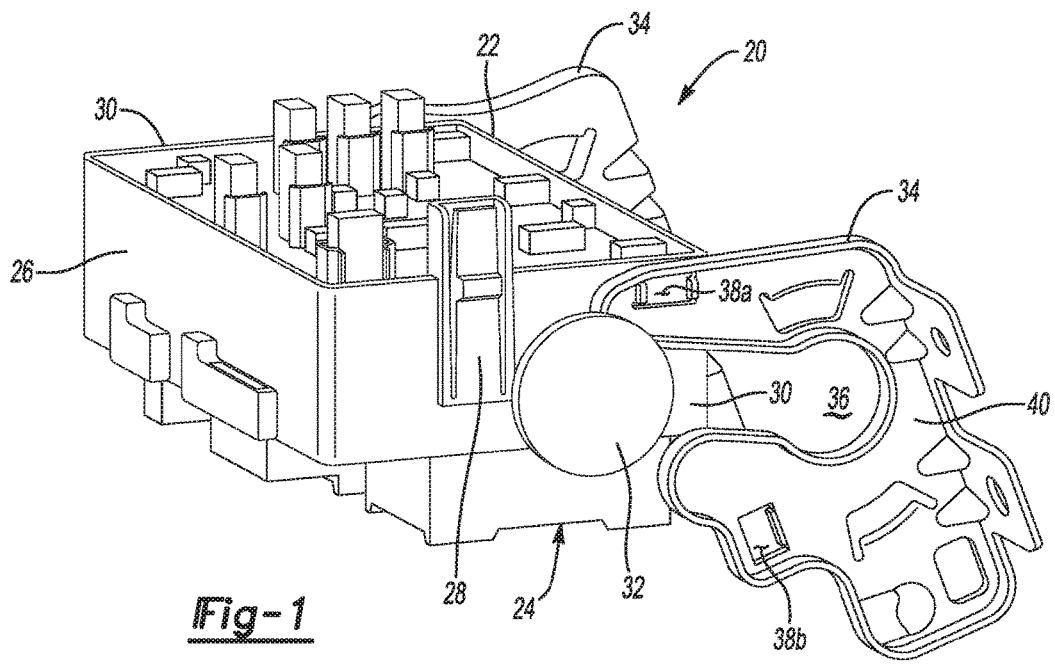
FIG. 1 is a perspective view of a power distribution center mounting assembly including the power distribution center and mounting brackets prior to assembly of the structures.
Figure 2:
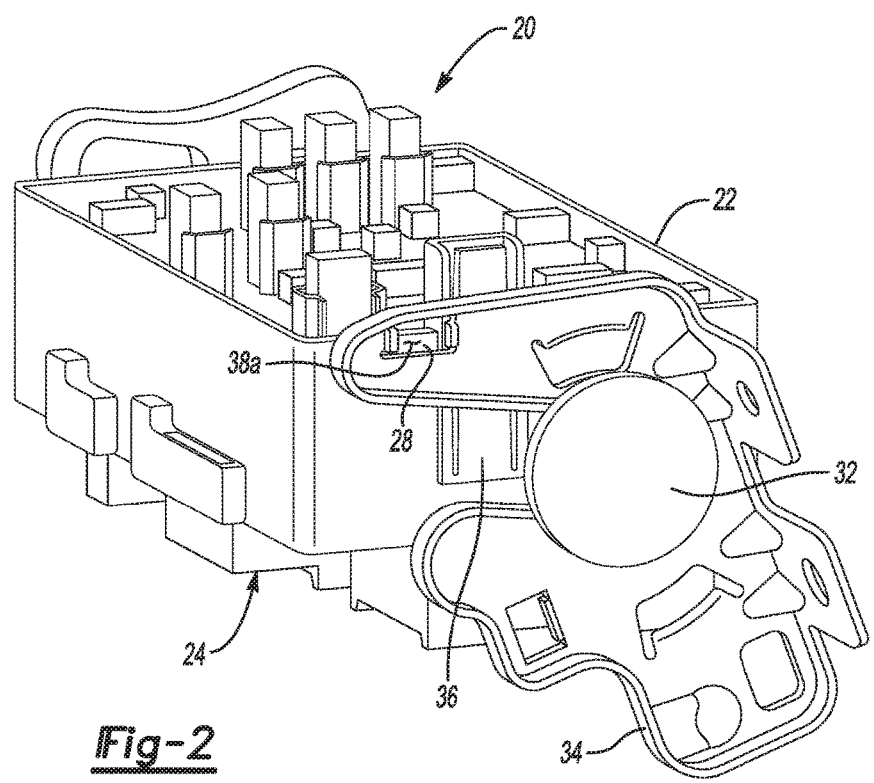
FIG. 2 is a perspective view of the power distribution center mounting assembly with the power distribution center positioned in a pre-staged position.
Figure 3:
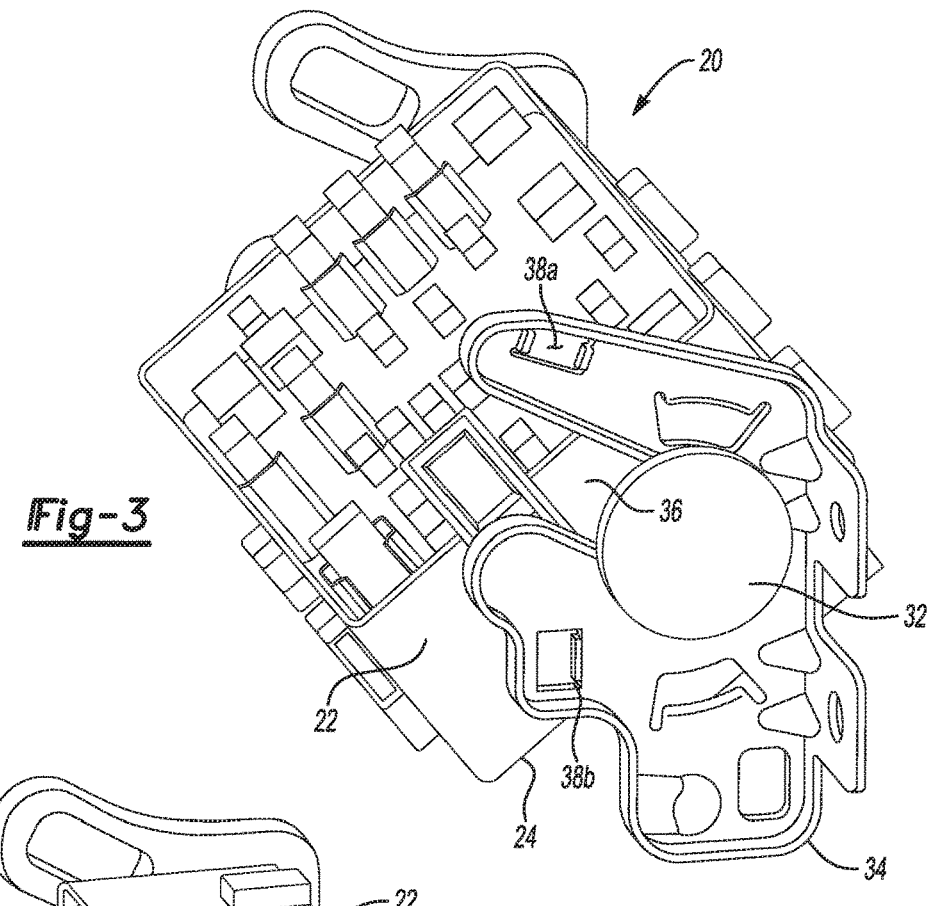
FIG. 3 is a perspective view of the power distribution center mounting assembly after the pre staged lock has been released and the power distribution center is being rotated.
Figure 4:
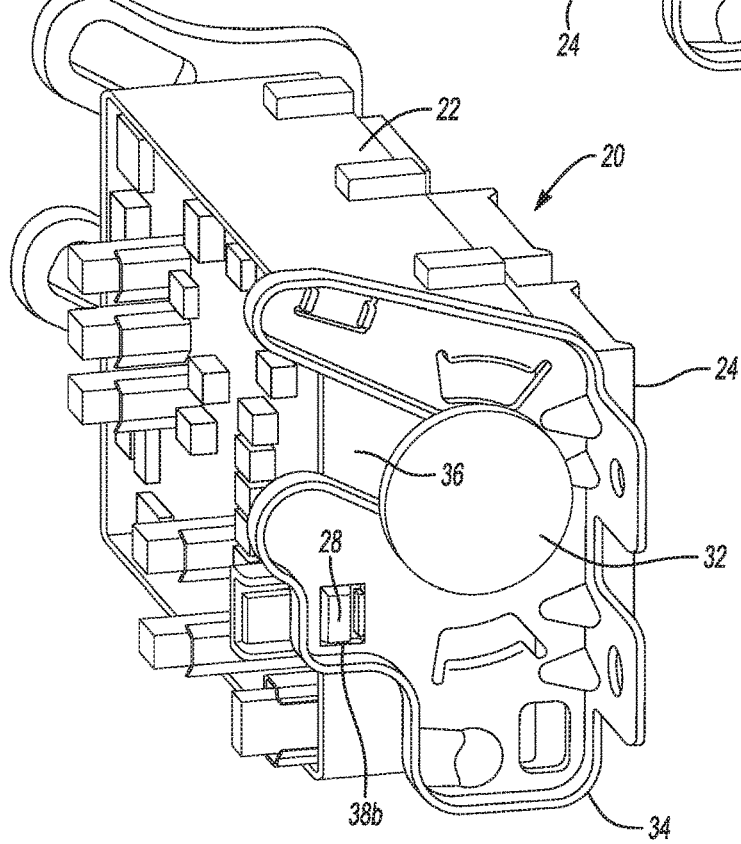
FIG. 4 is a perspective view of the power distribution center mounting assembly with the power distribution center in a final staged position.
Figure 5:
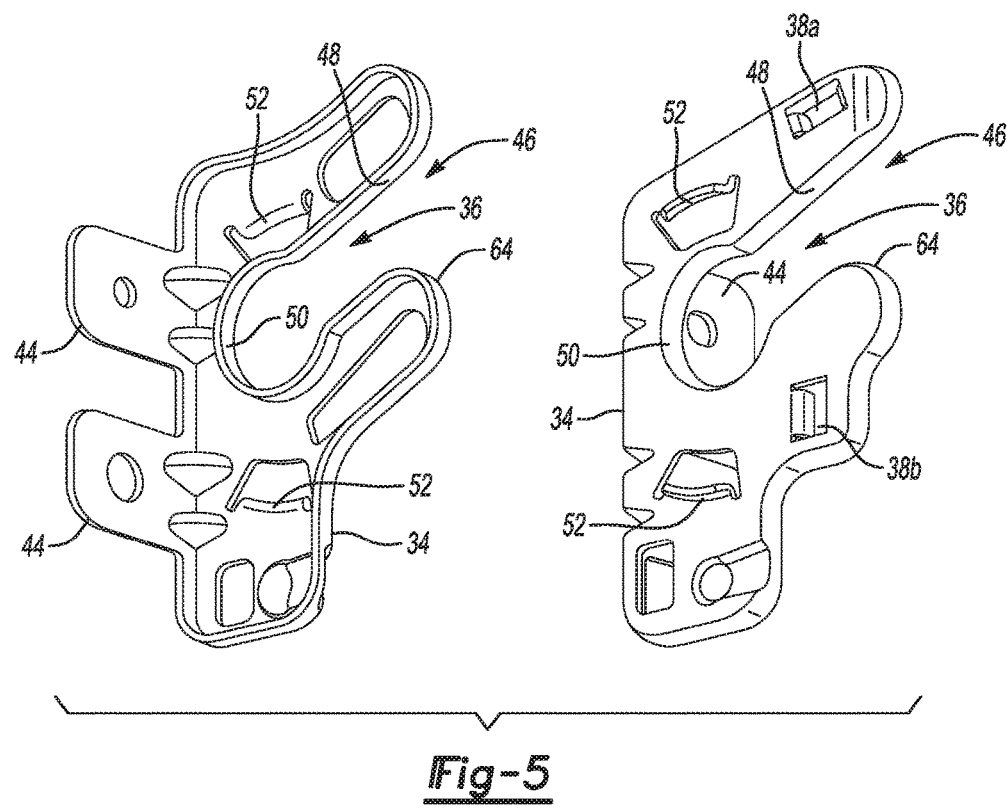
FIG. 5 is a perspective view of the pair of pivot brackets.
Figure 6:
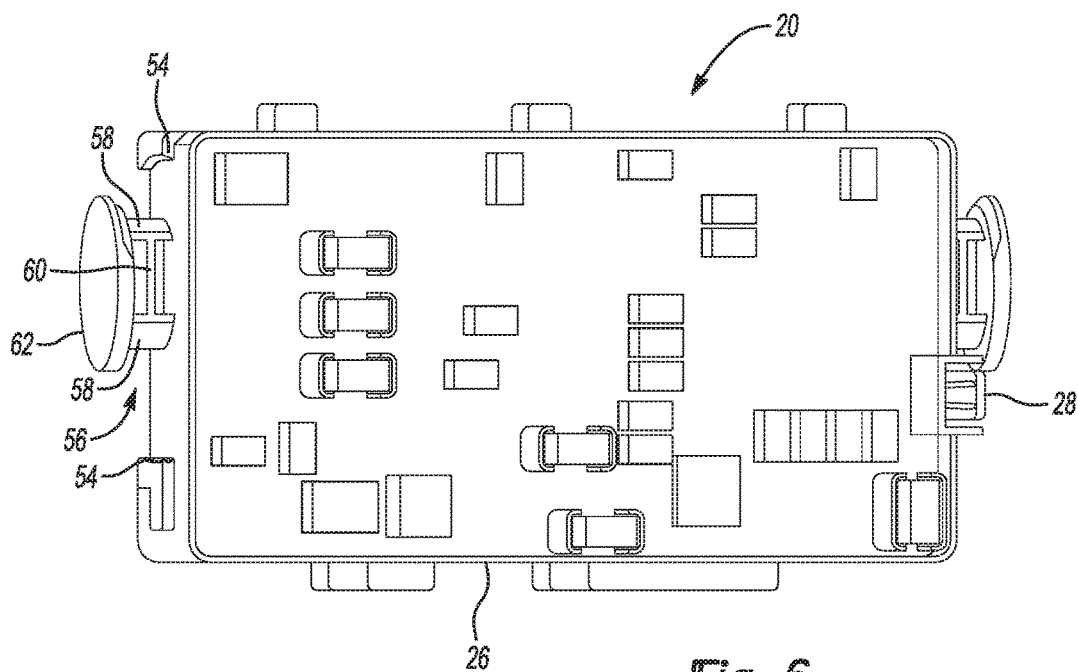
FIG. 6 is a perspective view of a power distribution center including the housing and locking structure as well as the pivot structures.
Figure 7:
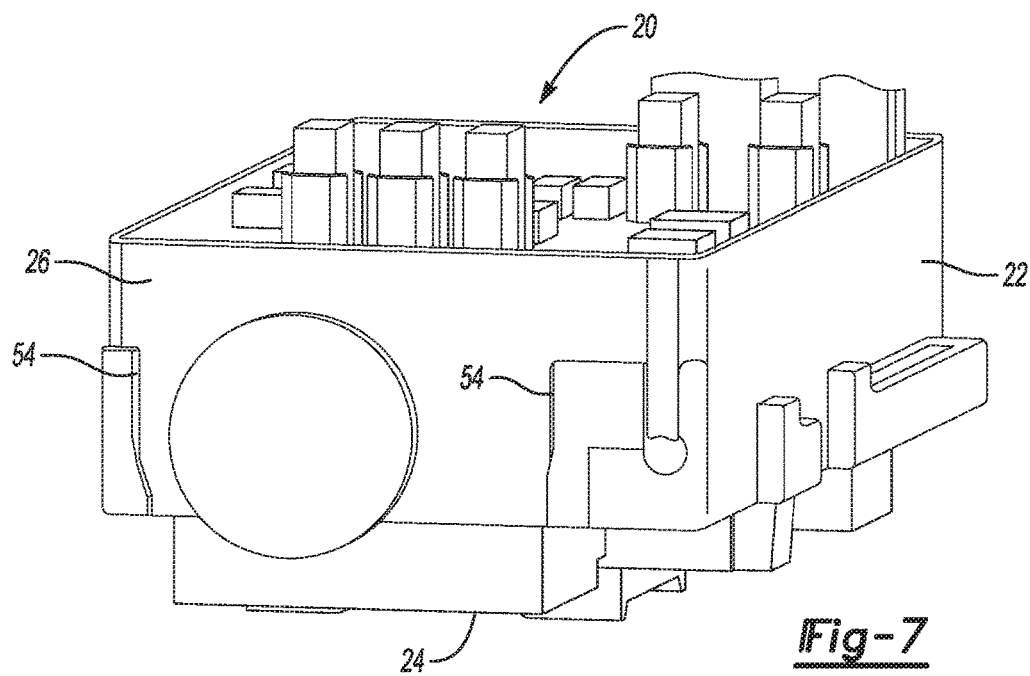
FIG. 7 is a side perspective view detailing the housing, connection surface, pivot structures, and ribs of the housing.
Figure 8:
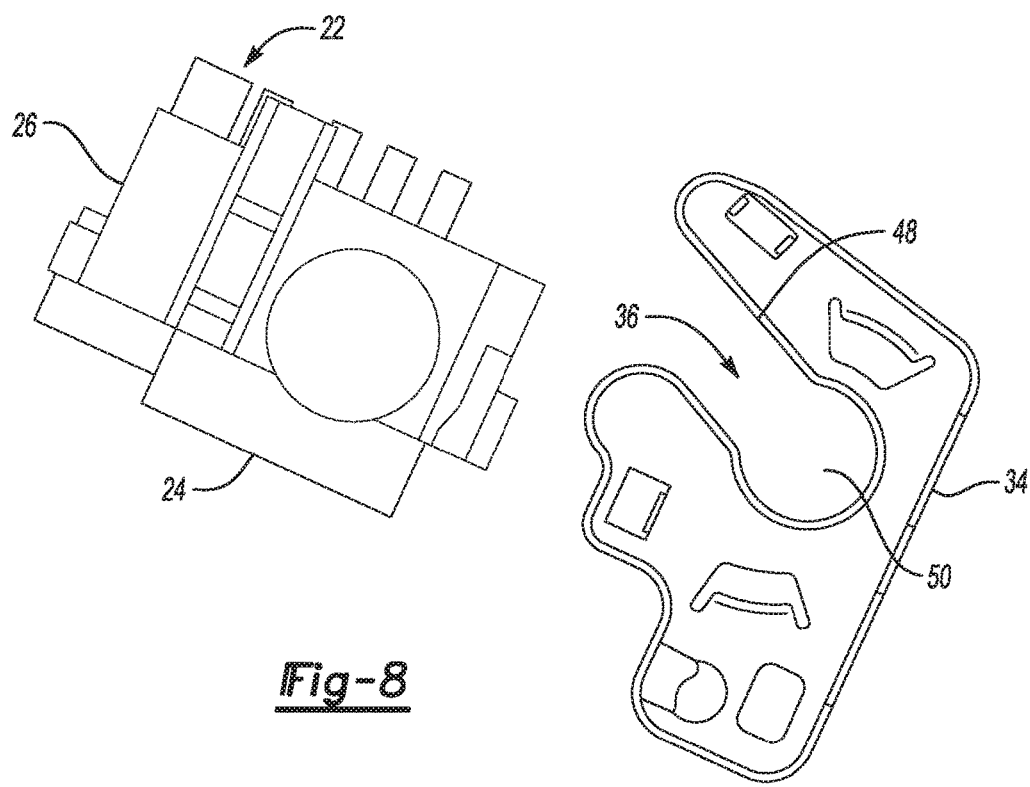
FIG. 8 is a partial side view detailing the power distribution center mounting assembly in an unassembled position.
Figure 12:
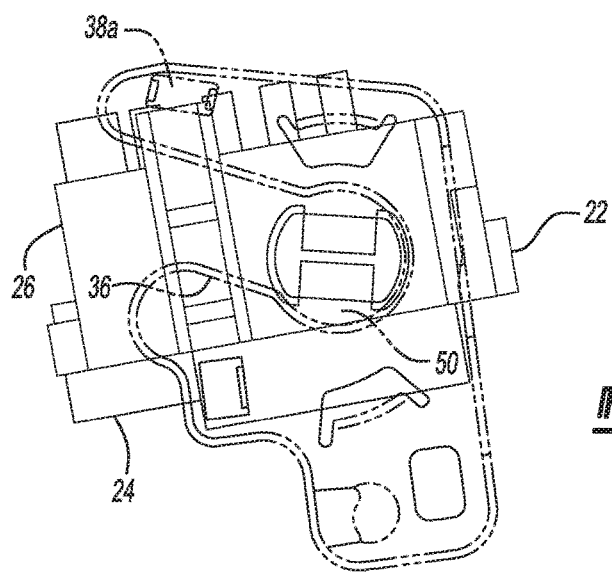
FIG. 12 is a side view of the power distribution center after being released from the pre staged lock position and being rotated toward a final staged position.
Figure 13:
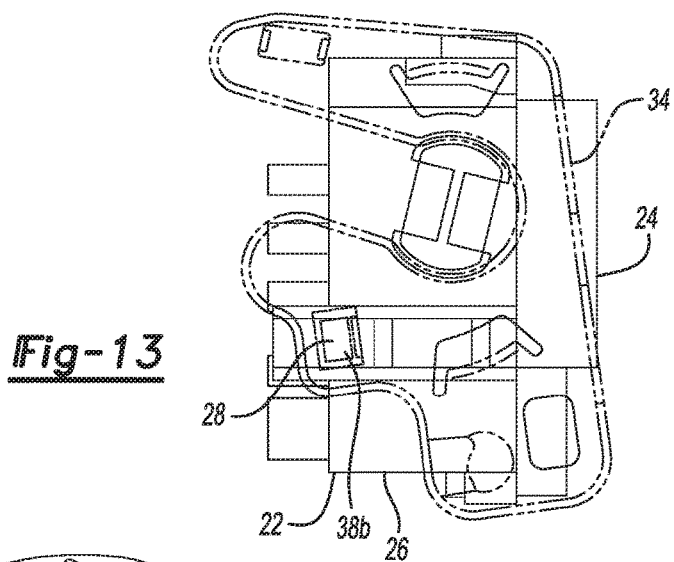
FIG. 13 is a side view of the power distribution center in a final staged position.
Figure 15:
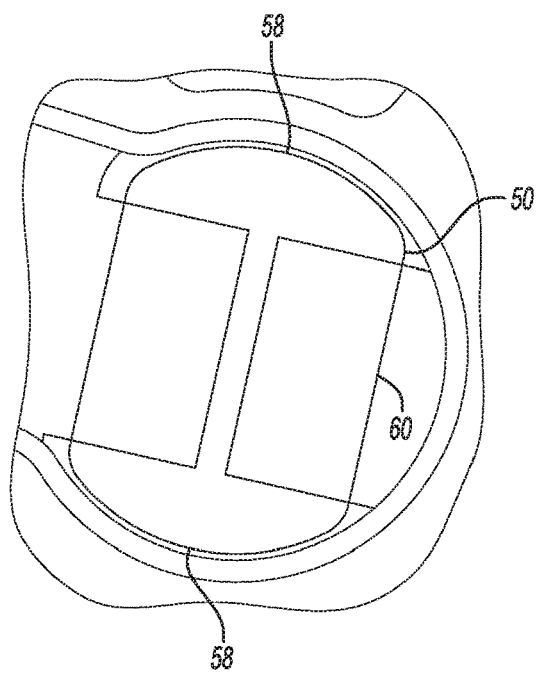
FIG. 15 is a partial side view of the pivot structure fully disposed within the pivot slot.
Figure 16:
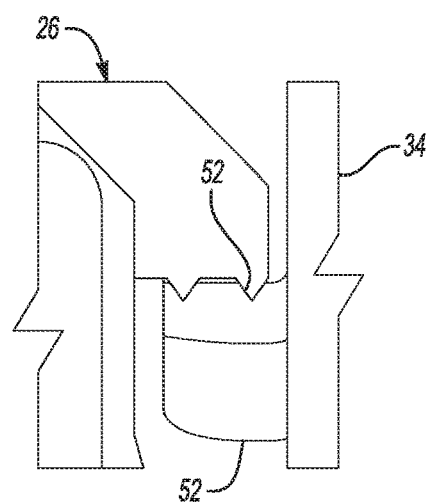
FIG. 16 is a partial end view of the ribs of the housing engaging the flange on the pivot brackets.

Referring to FIGS. 10 and 15, it can be seen that the circular surfaces 58 of the pivot structure 32 contact the ovoid pivot hub 50 of the pivot slot 36 after the power distribution center 22 has been fully inserted within the pivot slot 36. Once the power distribution center 22 has achieved this position, next the installer may pivot the power distribution center 22 upward slightly such that the locking structure 28 formed on the housing 26 is positioned within the pre staged lock slot 38a as best seen in FIGS. 2 and 11. In the pre staged position, the power distribution center 22 is releasably retained such that the connection surface 24 is positioned at an inclined angle wherein the person assembling components has a visual view of the connection surface 24. In one aspect, the connection surface 24 is visible relative to a horizontal plane H that extends from a bottom of the housing 26. In one aspect, the connection surface 24 may be positioned at an inclined angle A of from 10 to 30 degrees relative to the horizontal plane H. After an installer has connected all the necessary components to the connection surface 24 the installer may release the locking structure 28 from the pre staged lock slot 38a and pivot the power distribution center 22 downwardly within the pivot slots 36 as best shown in FIGS. 3 and 12. Continued rotation of the power distribution center 22 results in the locking structure 28 being positioned within the final staged lock slot 38b formed in the pivot bracket 34. This position is depicted in FIGS. 4, 13, and 16.

In the final staged position, the connection surface 24 has been rotated such that it is positioned at an angle of from 80 to 100 degrees relative to the horizontal plane H. In this manner, the connection surface 24 is pivoted away from a vehicle occupant compartment as denoted by the figure arrow B. Additionally, the ribs 54 formed on the housing 26 contact the rib contact flanges 52 of the pivot brackets 34 such that rattles and other associated noises of the power distribution center 22 relative to the pivot brackets 34 are avoided, as best shown in FIG. 16.

Should the power distribution center 22 need to be serviced, a party may release the locking structure 28 from the final staged lock slot 38b and pivot the power distribution center 22 upward such that the connection surface 24 is easily accessible.

The invention claimed is:

1. A power distribution center mounting assembly for a vehicle comprising:
a power distribution center including a connection surface and the power distribution center including a housing, the housing having a locking structure made of a resilient material, formed thereon on at least one side of the housing, the housing including a pair of pivot structures disposed on opposing sides of the housing;
a pair of pivot brackets configured to engage opposing sides of the housing and further configured to be mounted on the vehicle, each of the pair of pivot brackets including a pivot slot formed therein receiving the pivot structures, wherein the pivot slot extends from an opening on a proximal end of the pivot slot and along an alignment section having planar walls terminating at an ovoid pivot hub at a distal end of the pivot slot; and
wherein at least one of the pivot brackets includes a pair of lock slots, each of which are spaced apart from each other and separated by the pivot slot, the pair of lock slots releasably engage the locking structure wherein engagement of one of the pair of lock slots to the locking structure places the power distribution center in the pre-stage position and engagement of the other of the pair of lock slots to the locking structure places the power distribution center in the final-stage position, wherein when in the pre-staged position the connection surface is positioned at an inclined angle wherein the connection surface is visible relative to a horizontal plane extending from a bottom of the housing.

2. The power distribution center mounting assembly of claim 1 wherein one of the pair of lock slots of at least one pivot bracket is a pre-staged lock slot and the other of the pair of lock slots of at least one pivot bracket includes a final staged lock slot.

3. The power distribution center mounting assembly of claim 2 wherein the power distribution center includes a pre-staged position wherein the locking structure is releasably positioned in the pre-staged lock slot and the connection surface is positioned at an inclined angle of from 10 to 30 degrees relative to the horizontal plane extending from the bottom of the housing and the power distribution center having a final staged position wherein the locking structure is releasably positioned in the final staged lock slot and the connection surface is positioned at an angle of from 80 to 100 degrees relative to the horizontal plane from the bottom of the housing.

4. The power distribution center mounting assembly of claim 1 wherein the pivot brackets include a body having a pair of separated arms defining the pivot slot and the body including mounting tabs for attaching to the vehicle.

5. The power distribution center mounting assembly of claim 1 wherein at least one of the pair of brackets incudes at least one rib contact flange formed thereon.

6. The power distribution center mounting assembly of claim 1 wherein the pivot structures include an oval cylinder extending from the side of the housing, the oval cylinder having opposing circular surfaces separated by a flat surface.

7. The power distribution center mounting assembly of claim 6 wherein the flat surface includes a length less than or equal to a major axis of an ovoid pivot hub at a distal end of the pivot slot.

8. The power distribution center mounting assembly of claim 1 wherein the pivot structure includes an end cap formed thereon defining a contact region of the pivot structures.

9. The power distribution center mounting assembly of claim 1 wherein the housing includes at least one rib that engages an at least one rib flange when the power distribution center is in the final staged position.

10. The power distribution center mounting assembly of claim 9 wherein the housing includes two or more ribs.

11. The power distribution center mounting assembly of claim 1 wherein the opening includes a lead in radius formed thereon aligning the pivot structure in the pivot slot.

* * * * *